US006628639B1

United States Patent
Ishii

(10) Patent No.: US 6,628,639 B1
(45) Date of Patent: Sep. 30, 2003

(54) WIRELESS NETWORK USING HIGH AND LOW DECISION THRESHOLDS FOR SELECTING AND MAINTAINING A CHANNEL

(75) Inventor: Kenichi Ishii, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/498,430

(22) Filed: Feb. 4, 2000

(30) Foreign Application Priority Data

Feb. 12, 1999 (JP) ............................................ 11-033782

(51) Int. Cl.[7] ................................................ H04Q 7/00
(52) U.S. Cl. ........................ 370/346; 370/333; 455/434
(58) Field of Search ................................ 370/252, 328, 370/329, 330, 340, 341, 338; 455/452, 453, 63, 67.3

(56) References Cited

U.S. PATENT DOCUMENTS 5,640,414 A    6/1997   Blakeney, II et al.
6,198,924 B1 * 3/2001   Ishii et al. ................... 455/343

FOREIGN PATENT DOCUMENTS

| JP | 8-33020 | 2/1996 |
|----|---------|--------|
| JP | 8-336177 | 12/1996 |
| JP | 10-66140 | 3/1998 |
| JP | 10-229579 | 8/1998 |
| WO | WO 96/05709 | 2/1996 |

* cited by examiner

Primary Examiner—Douglas Olms
Assistant Examiner—Robert W. Wilson
(74) Attorney, Agent, or Firm—Dickstein Shapiro Morin & Oshinsky LLP

(57) ABSTRACT

In a communication network, a wireless channel is selected from multiple channels. The interference level of the selected channel is determined and a first quality value is derived and compared to a first decision threshold. If the first quality value is smaller than the first decision threshold, the selected channel is abandoned and a new channel is searched. If the first quality value is greater than the first decision threshold, the selected channel is maintained for transmission of a packet. A second quality value of the maintained channel is continuously determined and compared to a second decision threshold which is lower than the first decision threshold. Only if the second quality value is smaller than the second decision threshold, the channel is abandoned and a channel search is initiated.

34 Claims, 12 Drawing Sheets

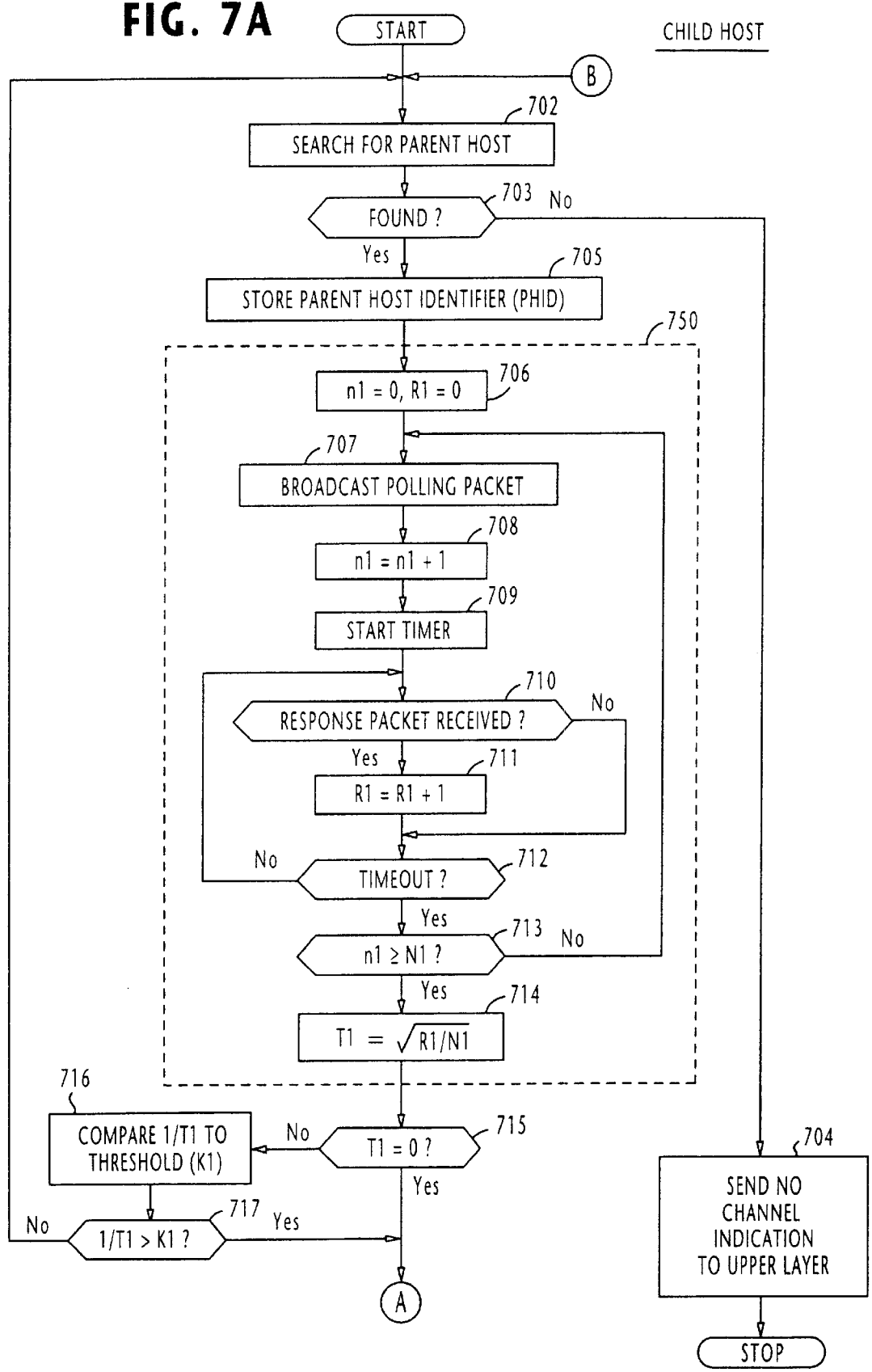

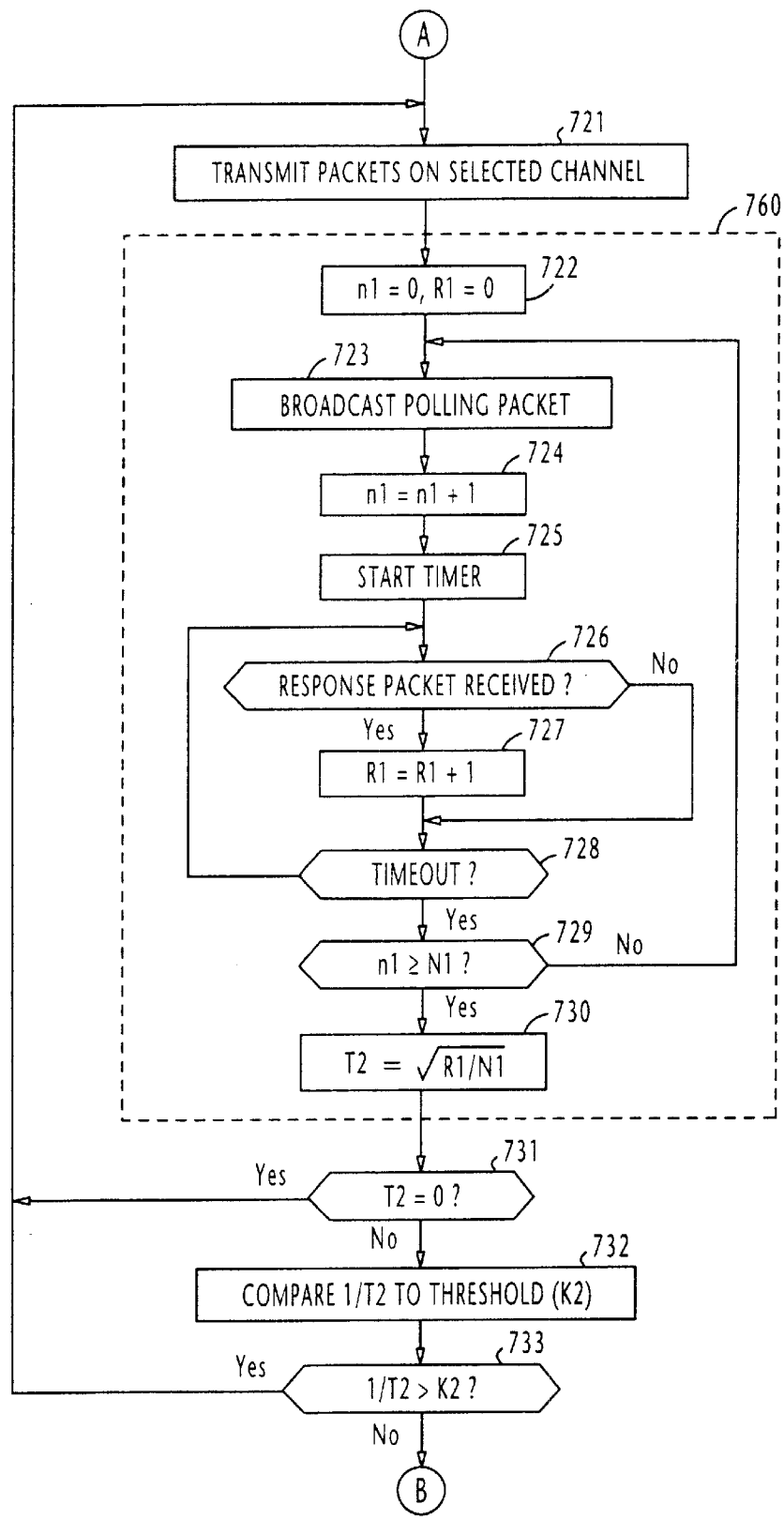
FIG. 7B   CHILD HOST

CHILD HOST

TIMER (C1) INTERRUPT

WIRELESS NETWORK USING HIGH AND LOW DECISION THRESHOLDS FOR SELECTING AND MAINTAINING A CHANNEL

BACKGROUND OF THE INVENTION

1. Field of the Invention

The present invention relates generally to wireless communication networks, and more specifically to a technique for selecting a wireless channel from multiple channels according to the interference level of the channel and maintaining the selected channel for transmission of data packets as long as the channel is of satisfactory quality. The present invention particularly relates to a method of determining the interference level of a Wireless channel of a communication network.

2. Description of the Related Art

Japanese Laid-Open Patent Application 10-66140 discloses a wireless communication network in which multiple wireless channels are shared by a plurality of subnetworks each comprising a parent host and multiple child hosts. The parent host provides management of the subnetwork and establishes packet communication with its own child hosts by sharing a single wireless channel. When the parent host of each subnetwork is powered on, it selects an idle channel from a plurality of channels allocated to the network and establishes the selected channel if there is no interference. If the upper layer of the parent host has a packet to send, it is transmitted on the established channel. On the other hand, each child host of the subnetwork, when powered on, makes a search for a channel of highest strength and selects it as the channel established by the parent host of its own subnetwork, based on the result of control packets exchanged with the parent host. If the child host detects even a single control packet on the selected channel that is transmitted from other parent host, it recognizes that there is interference and abandons the selected channel in favor of a new channel used by another parent host. Once the parent host is determined, the child host is ready to send packets on the channel established by the parent host.

A similar technique is disclosed in Japanese Laid-Open Patent Application 10-229579. According to this prior art, control packets are exchanged on a selected channel between hosts to determine its interference level. If the channel is found to be of acceptable quality, it is maintained and used for transmission of data packets. When the channel is being used for packet transmission, the channel is monitored for a channel ownership packet broadcast from other subnetwork. If such a packet is detected, it is determined that there is interference and the current channel is abandoned and a search for a new channel is initiated.

However, since the presence or absence of an interfering packet is the only factor for determining channel quality, precision measurement of interference is desired for efficient utilization of available channels. In particular, channel ownership packets broadcast from one subnetwork may be received by hosts of another subnetwork at a rate that varies with the severity of interference. Another shortcoming is that, since channel quality detection is performed independently on channel selection phase and data transmission phase based on comparison between channel quality and decision threshold, the communication between hosts may suffer from channel instability. If the decision threshold of the channel selection phase is lower than that of the data transmission phase, needs may often occur during transmission to initiate a channel search for a better channel. However, the use of lower decision threshold tends to increase the probability of lower quality channels being selected. Thus, the reselection of a channel may cause a further channel reselection.

The present invention is intended to solve these shortcomings. Prior art references which are of interest to the present invention are Japanese Laid-Open Patent Applications 8-33020 and 8-336177. In JP 8-33020, a base station collects traffic data from the network and establishes a channel to a mobile unit according to the start and end timing determined by the traffic data. Another interference detection technique disclosed in JP 8-336177 is based on the total length of time in which signals are received without error at a given rate, compared to the total length of time in which signals are received in error at the same rate.

SUMMARY OF THE INVENTION

It is therefore an object of the present invention to provide a method and a network for establishing a wireless communication channel that can avoid frequent switching of channels during packet transmission.

A further object of the present invention is to provide a method of precisely determining the interference level of a wireless channel to prevent frequent channel switching.

Briefly, the method of the present invention comprises the steps of (a) selecting a wireless channel from a plurality of wireless channels, (b) detecting interference level of the selected channel and determining therefrom a first quality value and comparing the first quality value to a first decision threshold, (c) if the first quality value is smaller than the first decision threshold, returning to the step (a) to select another channel, (d) if the first quality value is greater than the first decision threshold, using the selected channel for transmission of a packet, (e) determining a second quality value of the maintained channel and comparing the second quality value to a second decision threshold which is lower than the first decision threshold, (f) if the second quality value is smaller than the second decision threshold, returning to the step (a) to select another channel, and (g) if the second quality value is greater than the second decision threshold, maintaining the used channel and returning to the step (e).

In one aspect of the invention, the interference determination step comprises the steps of (a) broadcasting a polling packet to the network and starting a timing operation, (b) receiving a response packet from the network and incrementing a count value, (c) repeating the step (b) until the timing operation expires, (d) repeating the steps (c) to (d) a predetermined number of times each time the timing operation expires, and (e) determining the interference level of the selected channel from a ratio of the count value to the predetermined number.

In a second aspect of the invention, the interference determination step comprises the steps of (a) identifying a parent host that can be accessed from a child host via the wireless channel, (b) broadcasting a polling packet from the child host to the network and starting a timing operation, (c) receiving at the child host, a response packet from the network and incrementing a count value if the packet is received from the identified parent host or from another child host which is communicating with the identified parent host, (d) repeating the step (c) until the timing operation expires, (e) repeating the steps (b) to (d) a predetermined number of times each time the timing operation expires, and (f) deriving the interference level of the selected channel from the count value and the predetermined number.

In a third aspect of the invention in which a channel ownership packet is broadcast to the network at intervals determined by a first timer, the interference determination step comprises the steps (a) starting a second timer, (b) receiving the channel ownership packet from the network and incrementing a count value in response to the receipt of the packet and identifying a source parent host of the received packet, (c) repeating the steps (b) until the timer expires, (d) repeating the steps (a) to (c) a predetermined number of times each time the second timer expires, and (e) deriving the interference level of the channel from the count value, timeout periods of the first and second timers, a number of different source parent hosts identified by the step (b), and the predetermined number.

In a fourth aspect of the invention, the interference determining step comprises the steps of (a) starting a timer, (b) repeatedly determining the interference power level of the wireless channel until the timer expires, (c) repeating the steps (a) and (b) a predetermined number of times each time the timer expires, (d) producing a sum of the interference power levels repeatedly determined by the step (b), and (e) deriving the interference level of the selected channel from the sum, the predetermined number and a timeout period of the timer.

In a fifth aspect of the invention, the interference determination step comprises the steps of (a) starting a timer, (b) detecting interference power level of the wireless channel higher than a predetermined level and incrementing a variable by a predetermined amount in response to the detection of the higher interference power level, (c) repeating the step (b) until the timer expires, (d) repeating the steps (a) and (b) a predetermined number of times each time the timer expires, and (e) deriving the interference level of the selected channel from the incremented variable, the predetermined number and a timeout period of the timer.

BRIEF DESCRIPTION OF THE DRAWINGS

The present invention will be described in further detail with reference to the accompanying drawings, in which:

FIGS. 7A and 7B are flowcharts of the operation of a child host of the network according to a third embodiment of the present invention;

DETAILED DESCRIPTION

Figure 1A:
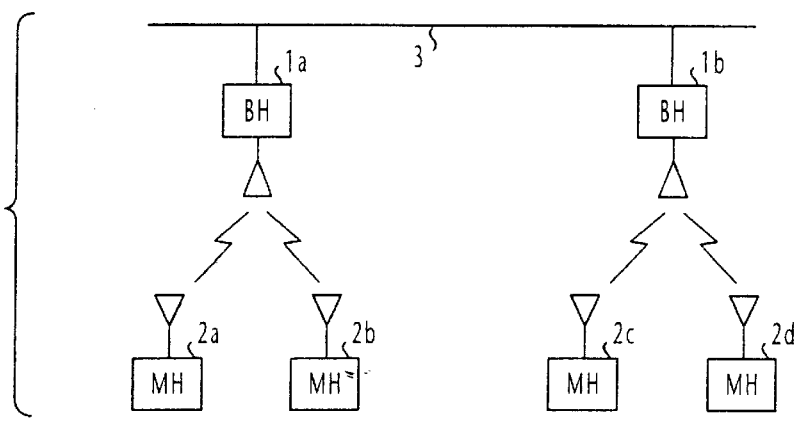
FIGS. 1A and 1B are block diagrams of a wireless communication network of the present invention.

In FIG. 1A, a wireless network of the present invention is shown as comprising base hosts 1 and mobile hosts 2. The network may be used as a wireless LAN (local area network). Thus, the base hosts are desktop or notebook computers and mobile hosts are notebook computers. Base hosts 1a and 1b are connected to the common medium 3 of the subnetwork to operate as parent hosts and mobile hosts 2a, 2b constitute child hosts of the parent host 1a and mobile hosts 2c, 2d form child hosts of the parent host 1b. Hosts 1a, 2a and 2b comprise a first wireless subnetwork and hosts 1b, 2c, 2d comprise a second wireless subnetwork. The local area network is allocated a frequency spectrum which is divided into a number of communication channels. In each subnetwork, each parent host selects one of the communication channels and the child hosts of the same subnetwork use the same channel for mutual communication. All channels of the network are shared by all hosts, so that when a packet is sent from a host of a given subnetwork it may also be received by the hosts of other subnetworks using the same channel.

The parent host of each subnetwork has the responsibility to select and establish a wireless communication channel for communication within that subnetwork and each of the child hosts of the same subnetwork selects the channel if one is already established by the parent host. If no channels are established by the parent host, the child host is responsible to select a new channel and informs the parent host of the identity of the selected channel.

Figure 1B:
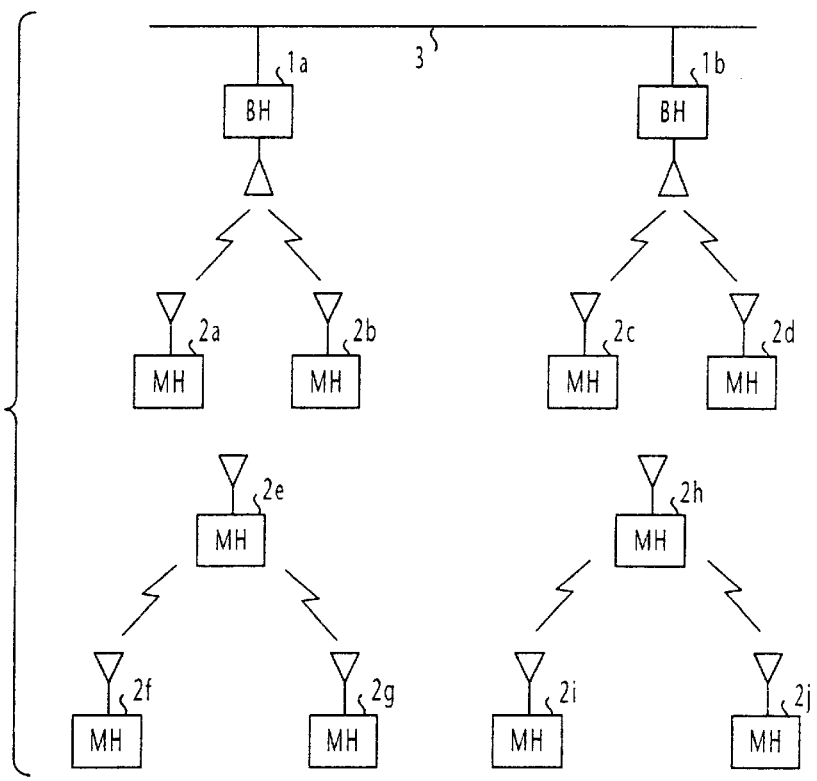

As shown in FIG. 1B, mobile hosts 2e to 2j may be additionally provided to form third and fourth wireless subnetworks. In this case, mobile host 2e operates as a parent of the mobile hosts 2f and 2g and mobile host 2h operates as a parent of the mobile hosts 2i and 2j. Further, the wireless communication network may be comprised of all mobile hosts such as mobile host terminals 2e to 2j.

Figure 2:
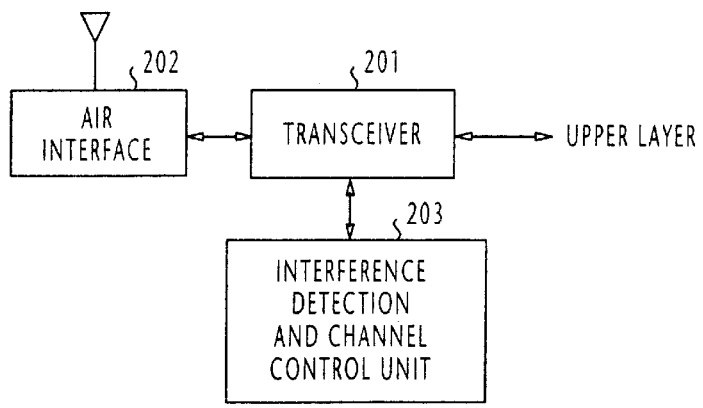
FIG. 2 is a block diagram of each host apparatus of the wireless communication network of the present invention.

As shown in FIG. 2, each host of the network includes a wireless transceiver 201 connected to the upper layer of the network protocol, an air interface 202 for interfacing the transceiver 201 to the network through a wireless link, and an interference detection and channel control unit 203 connected to the transceiver 201. As will be described in detail below, the interference detection and channel control unit 203 controls the transceiver 201 to select a wireless communication channel during a channel search phase and maintain the selected channel for transmission of packets. Channel control unit 203 detects the interference level of the selected channel during the channel search phase using a high channel quality decision threshold and continuously detects the interference level of the maintained channel during the packet transmission phase using a low channel quality decision threshold.

Figure 3:
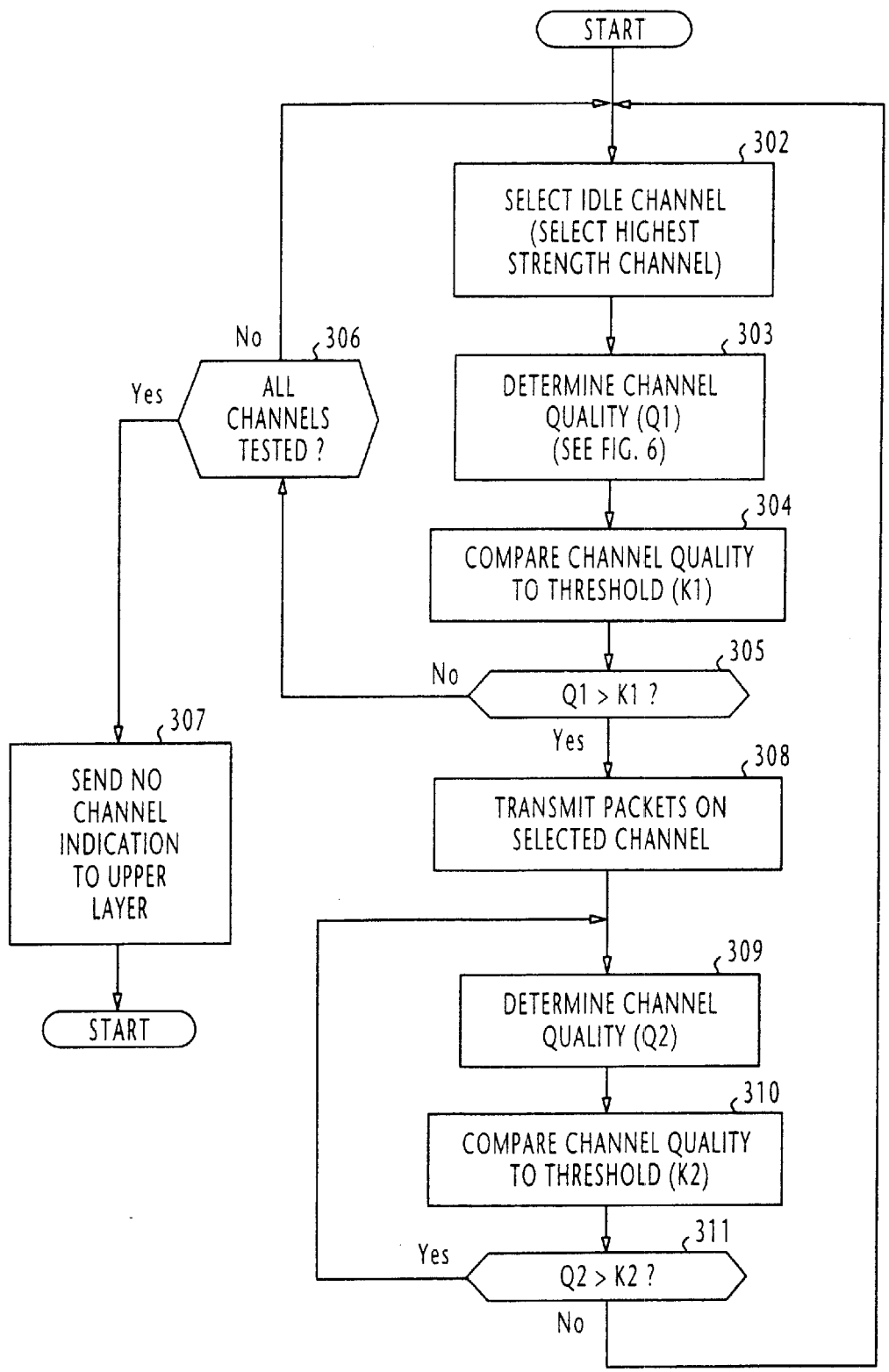
FIG. 3 is a flowchart of the operation of each host of the network according to a first embodiment of the present invention.

The operating sequence of the interference detection and channel control unit 203 of each host (either parent or child) according to a first embodiment of the present invention is illustrated in FIG. 3.

When each host of a subnetwork is powered on, it proceeds to step 302. If the host is a parent host, it selects an idle channel and if the host is a child host, it selects a highest strength channel as one established by a parent host. At step 303, the host determines the channel quality Q1 of the selected channel. The channel quality Q1 is then compared to a threshold K1 (step 304). If Q1 is smaller than K1, it is determined that the selected channel is unacceptable quality and flow returns to step 302 to reselect another channel if there are still channels not tested (step 306). If it is determined that all channels are of unacceptable quality, flow proceeds from step 306 to step 307 to send an indication to the upper layer no communication channels are currently available.

If 1/T1 is greater than K1, it is determined that the selected channel is of acceptable quality and the routine proceeds from step 305 to step 308 to forward data packets received from the upper layer onto the selected channel.

At step 309, the quality of the selected channel is continuously determined as a channel quality value Q2 by determining the bit error rate of packets received from destination host or by determining the interference level of the channel in a manner as will be described later. The channel quality value Q2 is compared to a threshold K2 that is smaller than K1 (step 310). If Q2 is greater than K2, it is determined that the current channel is of acceptable quality and flow returns from step 311 to step 308 to transmit packets and repeatedly perform the channel test.

If Q2 is smaller than K2, it is determined that the current channel is of unacceptable quality and the routine returns from step 311 to step 302 to abandon the current channel and restart a search for a new channel.

Since the threshold K1 for channel selection is greater than the threshold K2 for data transmission, channel switchover events are less likely to occur and hence high system stability is achieved.

Figure 4:
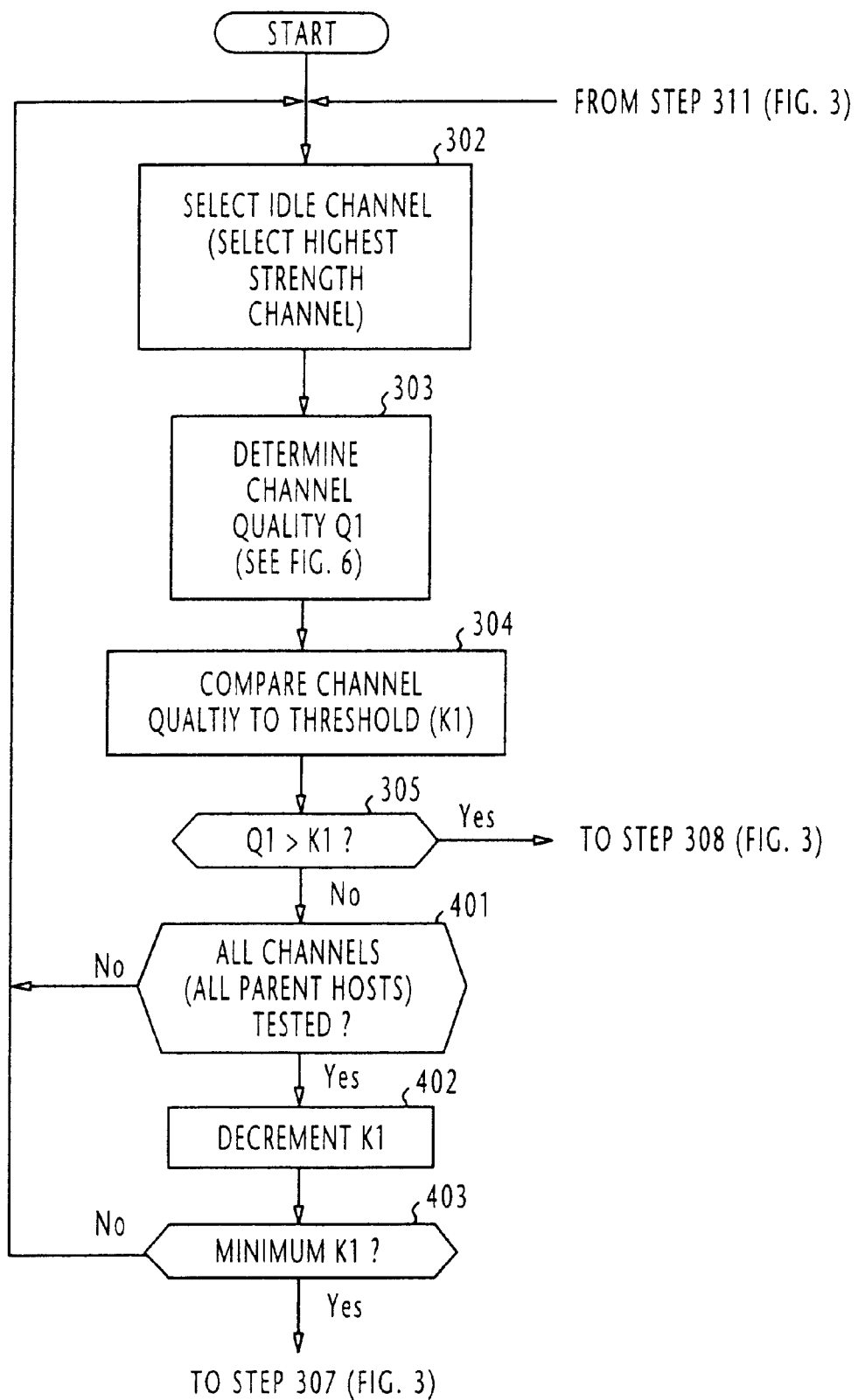
FIG. 4 is a flowchart of the operation of each host of the network according to a modification of the previous embodiment.

FIG. 4 is a modified form of the flowchart of FIG. 3. In this modification, steps 401 and 402 are additionally provided following step 306 of the flowchart of FIG. 3. When the decision at step 306 is affirmative, flow proceeds to step 401 to decrement the threshold K1 by a predetermined amount and the decremented K1 is compared to a predetermined minimum value of K1, which minimum value is greater than threshold K2. If the decremented K1 is not equal to the minimum K1 (step 402), control returns to step 302 to repeat the channel selection process. Otherwise, it is determined that no channels are available and flow proceeds to step 307. As long as K1 is greater than the predetermined minimum value, channel selection is repeated.

Note that the threshold values K1 and K2 of a parent host may not necessarily be the same as those of its child hosts. Use of different thresholds K1, K2 in parent hosts from those of child hosts ensures that the operational stability of parent hosts is independent of the operational stability of child hosts.

Figure 5:
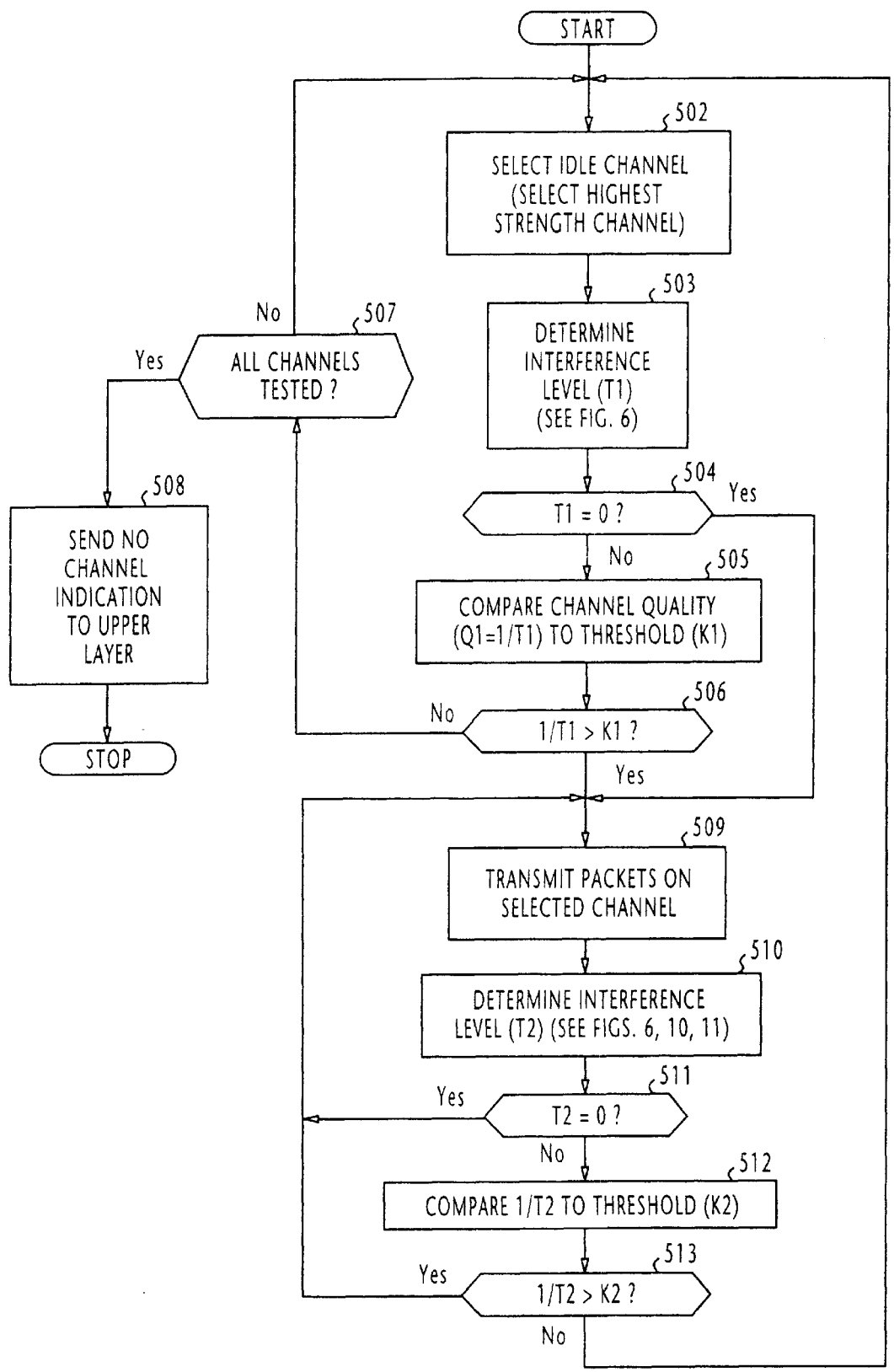
FIG. 5 is a flowchart of the operation of each host of the network according to a second embodiment of the present invention.

A call establishment method for each host is shown in FIG. 5 according to a second embodiment of the present invention.

When the host (either parent or child) is powered on, it selects a channel at step 502 and determines its interference (noise) level T1 at step 503. If no interference (T1=0) exists (step 504), flow proceeds from step 504 to step 509. If T1 is not equal to zero, flow proceeds from step 504 to step 505 to compare the reciprocal (1/T1), which represents the quality of the selected channel, to the threshold K1. If the quality value 1/T1 is smaller than K1, it is determined that the selected channel cannot be used and flow returns to step 502 to select another channel if all channels are not tested (step 507). If all channels are of low quality, flow proceeds from step 507 to step 508 to send a no-channel indication to the upper layer.

If the quality value 1/T1 is greater than K1, it is determined that the selected channel can be used and the routine proceeds from step 506 to step 509 to forward data packets received from the upper layer onto the selected channel.

The interference level T2 of the selected channel is continuously determined at step 510. If T2=0 (step 511), steps 509 and 510 are repeated. Otherwise, flow proceeds from step 511 to step 512 to compare the reciprocal 1/T2 to the threshold K2. If the channel quality 1/T2 is greater than K2 (step 513), steps 509 to 512 are repeated. If 1/T2 is smaller than K2, it is determined that the current channel is of poor quality and the routine returns to step 502 to reselect another channel.

Figure 6:
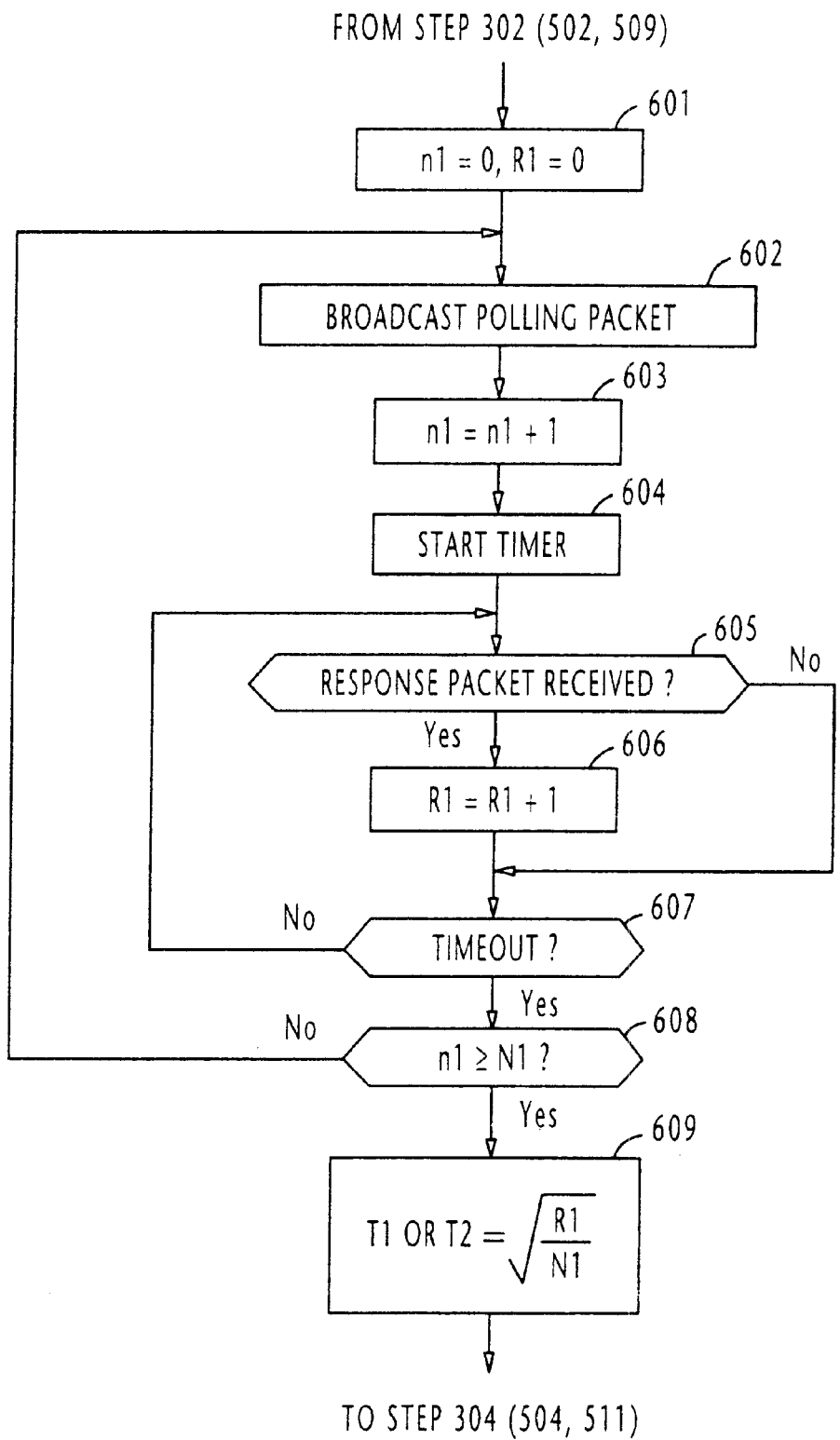
FIG. 6 is a flowchart of the operation of the host associated with FIGS. 3 and 5 during the process of interference determination.

Interference level can be precisely determined by the flowchart of FIG. 6. This flowchart can be used for interference determination steps 303, 503 and 510.

At step 601, variables n1 and R1 are set equal to zero. A polling packet is broadcast from the source host to every other hosts of the same subnetwork (step 602) and the variable n1 is incremented by one (step 603) and a timer is started (step 604). The polling packets urge responders to return a response packet containing the identity of the responding host. Hosts of other subnetworks as well as the hosts of the same subnetwork may receive the polling packet if they are currently using the same channel and return a response packet.

When a response packet is received (step 605), the variable R1 is incremented by one at step 606 and elapsed time of the timer is checked (step 607). If the timer is still running, flow returns from step 607 to step 605 to wait for the next response packet. If the timer has expired, flow proceeds to step 608 to check to see if the variable n1 is equal to or greater than a predetermined value N1. If n1 is smaller than N1, flow returns to step 602 to transmit the broadcast packet again to receive a response packet. If n1≧N1, flow proceeds from step 608 to step 609 to calculate the square root of (R1/N1) as the level of interference T1 (or T2). Since N1 equals the number of broadcast packets transmitted, the ratio R1/N1 represents the ratio of the number of received packets to the number of transmitted packets. If the interference level of a channel is high, it is likely that undesired signals are arriving from many sources. Thus, the interference level can be represented by the ratio R1/N1.

Flowcharts shown in FIGS. 7A and 7B concerns a communication method performed by a child host according to a third embodiment of the present invention. This embodiment is useful for child hosts to precisely determine the level of interference.

When a child host is powered on, it makes a search for a parent host transmitting a high strength signal (step 702). If such a parent host is not found (step 703), the child host proceeds to step 704 to inform the upper layer that no channels are available. If a parent host is found (step 703), the child host proceeds to step 705 to store the identifier PHID of the parent host and enters an interference determination subroutine 750 which is identical to the flowchart of FIG. 6.

Specifically, at step 706, variables n1 and R1 are set equal to zero. A polling packet is broadcast from the child host to every other hosts of the same subnetwork (step 707). Variable n1 is incremented by one at step 708, and a timing operation is started at step 709, and the routine checks to see if a response packet is received (step 710). Variable R1 is incremented by one at step 711 if a response packet is received, and steps 710 and 711 are repeated if the timing action is still in progress. When the timing action expires, the child host returns from step 713 to step 707 if n1 is smaller than N1. When n1 is equal to or greater than N1, the child host determines the interference level T1 at step 714, and exits subroutine 750.

If an accessible parent host is not found (step 704), it is determined that the selected channel cannot be used and the routine returns to channel selection step 702 if all channels are not tested (step 718).

Next, the interference level T1 is tested. If T1=0 (step 715), the child host proceeds to step 721 to transmit data packets (FIG. 7B). Otherwise, it proceeds to step 716 to compare the quality value 1/T1 to the threshold K1. If 1/T1 is greater than K1 (step 717), flow proceeds to step 721. Otherwise, it returns to channel selection step 702.

Following step 721, the interference level T2 of the selected channel is determined by subroutine 760 which includes steps 722 to 730 respectively corresponding in significance to steps 706 to 714 of FIG. 7A.

If the interference level T2 that is determined by step 730 is equal to 0 (step 731), steps 721 to 730 are repeated. Otherwise, flow proceeds from step 731 to step 732 to compare the quality value 1/T2 to the threshold K2. If 1/T2 is greater than K2 (step 733), steps 721 to 732 are repeated. If 1/T2 is smaller than K2, the child host determines that the current channel is of poor quality and returns to step 702.

Figure 8:
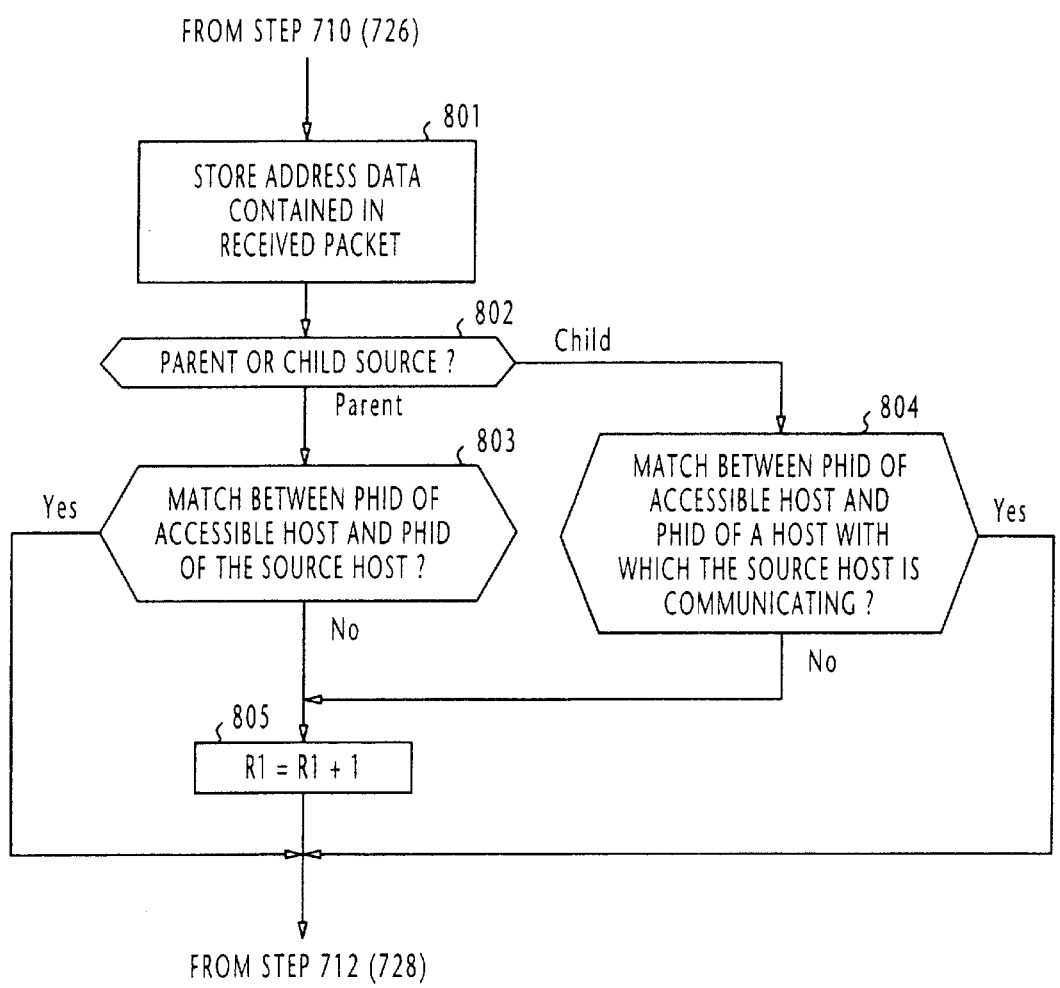
FIG. 8 is a flowchart of the operation of the child host associated with FIGS. 7A and 7B during the process of interference determination.

By using the parent host identifier PHID stored at step 705 (FIG. 7A), the number of received response packets (i.e., represented by variable R1) is precisely determined by a subroutine shown in FIG. 8. This subroutine corresponds to steps 711 and 727 of FIGS. 7A and 7B.

In FIG. 8, address data contained in a received response packet is stored in memory (step 801) following the execution of step 710 (FIG. 7A). The address data includes a source address if the source of the response packet is a parent host. If the source is a child host, the response packet includes its identity and the identity of a parent host with which it is communicating.

At step 802, the child host examines the address data of the response packet to determine if the source of the packet is a parent host or a child host. If the packet source is a parent host, control proceeds from step 802 to step 803 to detect a match between the stored parent host identifier PHID and the identifier of the source parent host. If they match, flow proceeds from step 803 to step 711. Otherwise, the variable R1 is incremented by one at step 805. If the packet source is a child host, control proceeds from step 802 to step 804 to detect a match between the stored parent host identifier PHID and the identifier of the parent host with which the source child host is communicating. If they match, flow proceeds from step 804 to step 711. Otherwise, the variable R1 is incremented by one at step 805.

Figure 9A:
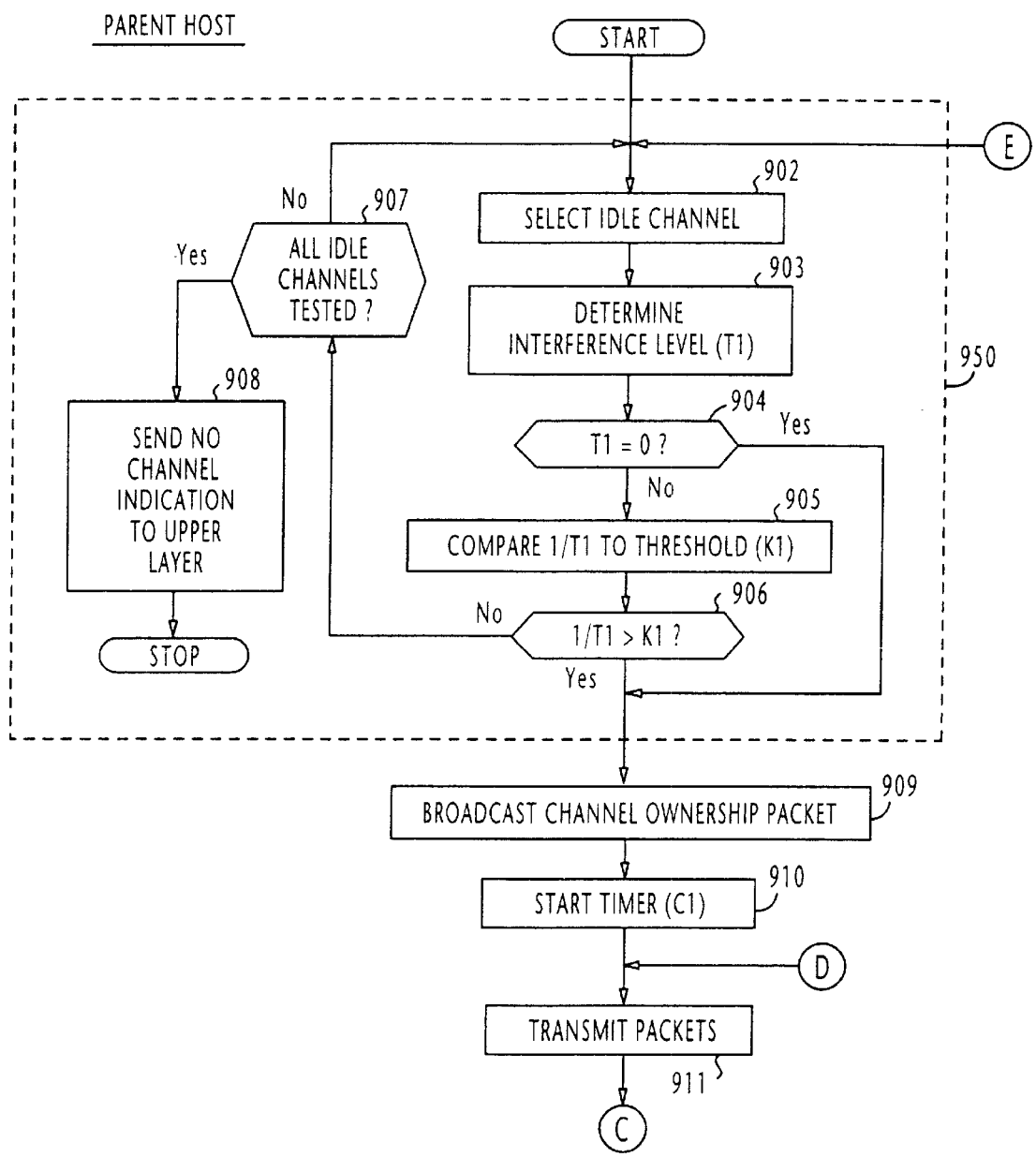
FIGS. 9A, 9B and 9C are flowcharts of the operation of a parent host of the network according to a fourth embodiment of the present invention.
Figure 9C:
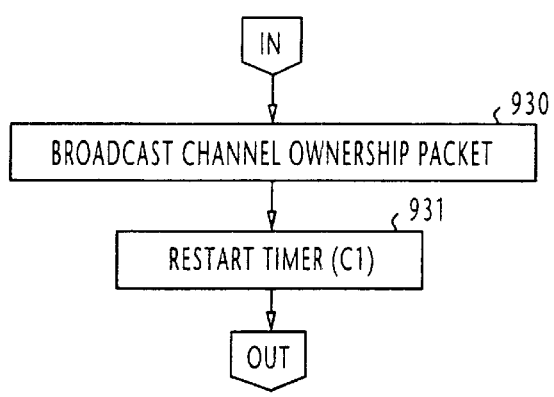
Figure 9B:
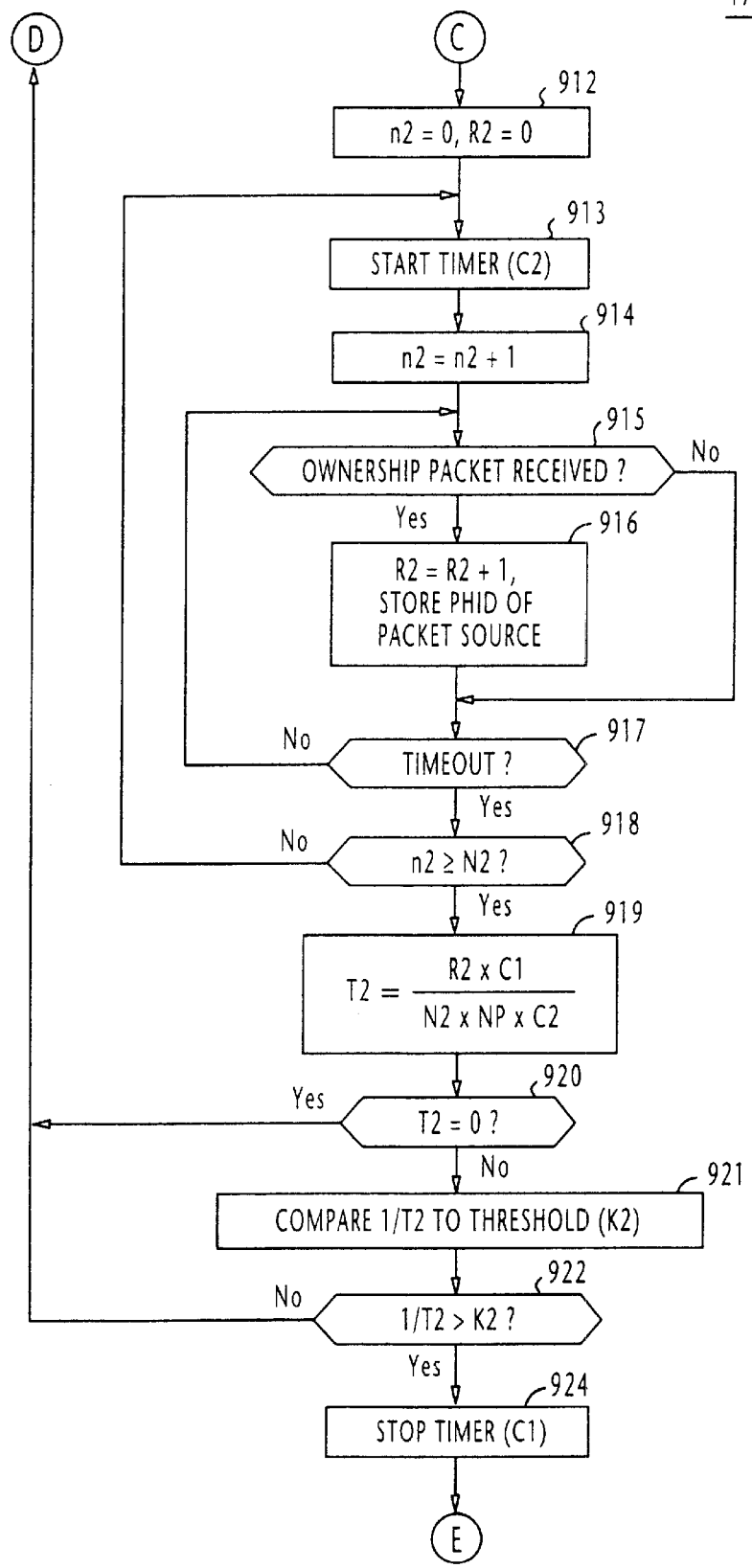

Flowcharts shown in FIGS. 9A, 9B and 9C concerns a communication method performed by a parent host according to a fourth embodiment of the present invention. This method is useful for parent hosts to precisely determine the level of interference.

The parent host executes a subroutine 950 which includes steps 902 to 907 that respectively correspond to steps 502 to 508 of FIG. 5.

When a parent host is powered on, it selects an idle channel (step 902) and determines its interference (noise) level T1 at step 903. If TI is not equal to zero (step 904), the parent hold compares the reciprocal (1/TI) to the threshold K1. If 1/T1 is smaller than K1, the parent host returns to channel selection step 902 if all channels are not tested (step 907) to reselect another idle channel. If all channels are of low quality, the parent host proceeds to step 908 to send a no-channel indication to the upper layer. If 1/T1 is greater than K1 (step 906) or T1=0 (step 904), the parent host broadcasts a channel ownership packet to the network (step 909) and starts a timer (with a timeout period C1) at step 910. Data packets are then sent to the selected channel (step 911). Following the execution of step 910, the parent host proceeds to the flowchart of FIG. 9B.

When the first timer expires, the parent host exist the main routine and initiates a timer (C1) interrupt routine as shown in FIG. 9C. In response, the parent host broadcasts a channel ownership packet containing its identity and the identity of the channel selected by the parent host (step 930), restarts the first timer (step 931) and returns to the main routine.

In FIG. 9B, the parent host sets variables n2 and R2 to zero (step 912) and proceeds to step 913 to start a second timer (with a timeout period C2) and increments the variable n2 by one (step 914). At decision step 915, the parent host checks to see if a channel ownership packet is received from another parent host, announcing that it is using the same channel. If so, flow proceeds to step 916 to increment the variable R2 by one and store the identity of that parent host. If no channel ownership packet is received, steps 915 and 916 are repeated as long as the second timer is running (step 917). When the second timer (C2) expires, the parent host proceeds from step 917 to step 918 to determine if n2 is equal to or greater than a predetermined value N2. If not, flow returns from step 918 to step 913 to repeat the counting of ownership packets from other parent hosts.

If n2 is equal to or greater than N2, the parent host proceeds from the packet counting routine to step 919 where it determines the interference level T2 by calculating (R2·C1)/(N2·NP·C2), where NP is the number of parent hosts from which the channel ownership packets are received.

In more detail, the timeout period C1 is the interval at which channel ownership packets are broadcast from a parent host and the timeout period C2 represents the observation time for receiving channel ownership packets. The ratio C2/C1 represents the number of channel ownership packets broadcast from a single parent host within the observation time C2. By multiplying this ratio by NP (i.e., NP·C2/C1), the number of channel ownership packets received by a parent host within the observation time C2 is obtained. Since N2 is the maximum number of times the interference measurements are repeated, multiplying NP·C2/C1 by N2 results. in the total number of channel ownership packets broadcast during repeated measurement times. Since R2 indicates the total number of broadcast packets received during the repeated measurement times, the interference level T2 is obtained by dividing R2 by N2·NP·C2/C1.

If the interference level T2 is equal to zero (step 920), flow returns to step 911 to transmit data packets. If T2 is not equal to zero, flow proceeds from step 920 to step 921 to compare the reciprocal 1/T2 to the threshold K2. If 1/T2 is smaller than K2 (step 922), the packet transmission and interference determination are repeated. Otherwise, it is determined that the current channel is of poor quality and the parent host changes the channel status from "busy" to "idle" (step 923).

With the channel,status being changed to "idle", the patent host stops the first timer at step 924, and returns to channel reselection step 902.

It is seen therefore that channel ownership packets are repeatedly broadcast from a parent host at intervals determined by the timeout period C1 during the time a channel is used for transmission of data packets within a subnetwork.

Figure 10:
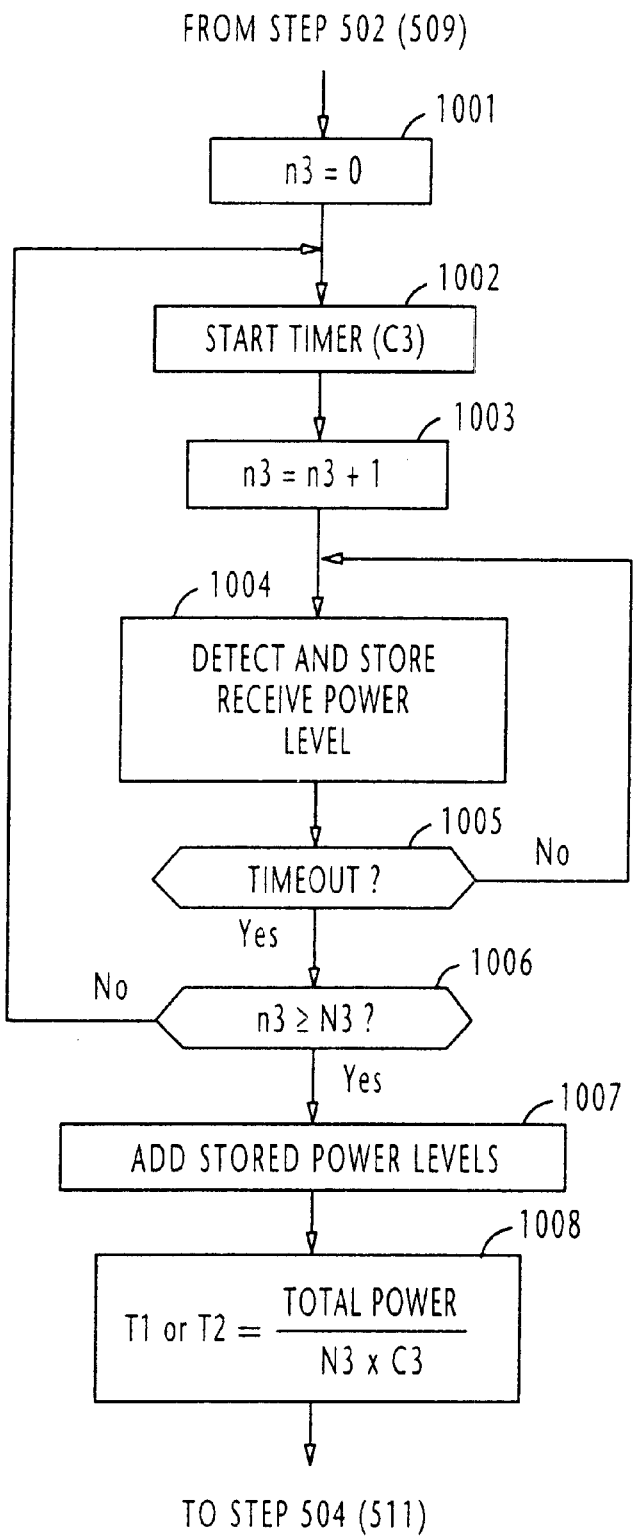
FIG. 10 is a flowchart of the operation of each host of the network associated with FIG. 5 according to one form of the present invention during the process of interference detection.

Another method for interference determination step 503 of channel search phase and step 510 of communication phase is shown in FIG. 10. A variable n3 is set to zero (step 1001) and a timer (with a timeout period C3) is started (step 1002) and the variable n3 is incremented by one (step 1003). At step 1004, interference power level is detected and stored in memory. Step 1004 is repeated until the timer expires (step 1005). When the timer expires and the variable n3 is smaller than a predetermined value N3 (step 1006), the timer is restarted at step 1002, n3 is incremented by one (step 1003) and interference power level is detected and stored again at step 1004. When n3 becomes equal to or greater than N3 at step 1006, all stored interference power levels are added up to produce a total power value (step 1007). At step 1008, the interference level T2 is obtained by dividing the total power value by the total observation time C3·N3.

Figure 11:
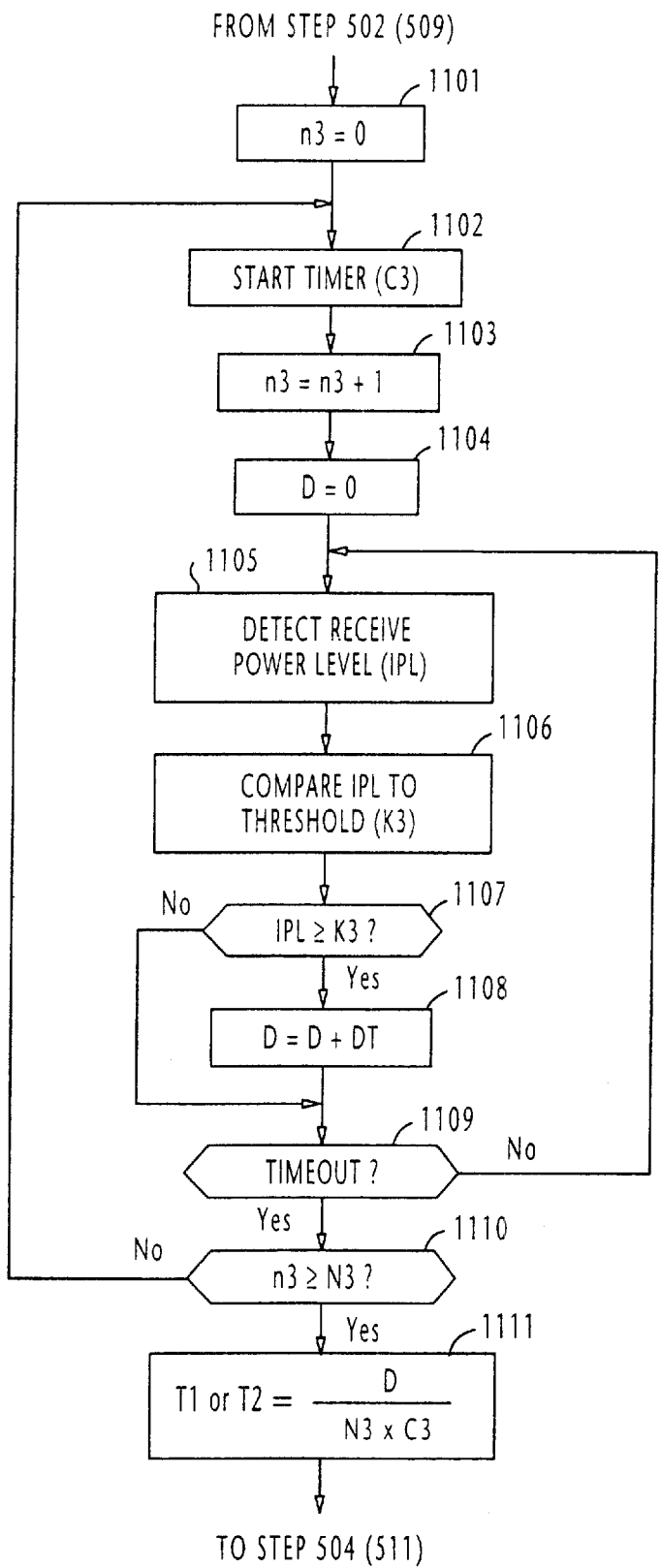
FIG. 11 is a flowchart of the operation of each host of the network associated with FIG. 5 according to a modified form of the present invention during the process of interference detection.

FIG. 11 shows a modification of FIG. 10. Variable n3 is set to zero (step 1101) and timer (C3) is started (step 1102) and the variable n3 is incremented by one (step 1103). Variable D is set to zero (step 1104) and the interference power level (IPL) is determined (step 1105). At step 1106, the interference power level is compared to a threshold value K3. If IPL is equal to or greater than K3 (step 1107), control proceeds to step 1108 to increment D by a constant DT which represents the length of time taken to determine the interference power level IPL. If IPL is smaller than K3 (step 1107), step 1108 is skipped. While the timer is still running, steps 1105 to 1108 are repeated so that the time-factor variable D is integrated. The integrated value D represents the amount of time in which interference of unacceptable power level is present. Steps 1102 to 1109 are repeated until n3 equals N3 at step 1110. At step 1111, the interference level T2 is obtained by the ratio of the interference presence time D to the total observation time C3·N3.

What is claimed is:

1. A method of establishing a channel in a wireless communication network, comprising the steps of:
    a) selecting a wireless channel from a plurality of wireless channels;
    b) detecting interference level of the selected channel and determining therefrom a first quality value and comparing the first quality value to a first decision threshold;
    c) if the first quality value is smaller than the first decision threshold, returning to the step (a) to select another channel;
    d) if the first quality value is greater than the first decision threshold, using the selected channel for transmission of a packet;
    e) determining a second quality value of the maintained channel and comparing the second quality value to a second decision threshold which is lower than the first decision threshold;
    f) if the second quality value is smaller than the second decision threshold, returning to the step (a) to select another channel; and
    g) if the second quality value is greater than the second decision threshold, maintaining the used channel and returning to the step (e).

2. The method of claim 1, wherein the step (c) comprises the steps of decrementing the first decision threshold by a predetermined value before returning to the step (a), the decremented first decision threshold being higher than the second decision threshold.

3. The method of claim 1, wherein the first quality value is a reciprocal of the interference level, and wherein the step (e) comprises the step of detecting interference level of the selected channel and deriving the second quality value from the reciprocal of the detected interference level.

4. The method of claim 1, wherein the step (b) comprises the steps of:
    b1) broadcasting a polling packet to the network and starting a timing operation;
    b2) receiving a response packet from the network and incrementing a count value;
    b3) repeating the step (b2) until the timing operation expires;
    b4) repeating the steps (b1) to (b3) a predetermined number of times each time said timing operation expires; and
    b5) determining the interference level of the selected channel from a ratio of said count value to said predetermined number.

5. The method of claim 1, wherein the step (e) comprises the steps of:
    e1) broadcasting a polling packet to the network and starting a timing operation;
    e2) receiving a response packet from the network and incrementing a count value;
    e3) repeating the step (e2) until the timing operation expires;
    e4) repeating the steps (e1) to (e3) a predetermined number of times each time said timing operation expires; and
    e5) deriving the interference level of the selected channel from said count value and said predetermined number.

6. The method of claim 1, wherein the wireless communication network is formed by a plurality of parent hosts and a plurality of child hosts, and wherein the step (b) comprises the steps of:
    b1) identifying a parent host that can be accessed from a child host via the selected channel;
    b2) broadcasting a polling packet from the child host to the network and starting a timing operation;
    b3) receiving, at said child host, a response packet from the network and incrementing a count value if the packet is received from the identified parent host or from another child host which is communicating with the identified parent host;
    b4) repeating the step (b3) until the timing operation expires;
    b5) repeating the steps (b2) to (b4) a predetermined number of times each time said timing operation expires; and
    b6) deriving the interference level of the selected channel from said count value and said predetermined number.

7. The method of claim 1, wherein the wireless communication network is formed by a plurality of parent hosts and a plurality of child hosts, and wherein the step (e) comprises the steps of:
    e1) identifying a parent host that can be accessed from a child host via the selected channel;
    e2) broadcasting a polling packet from the child host to the network and starting a timing operation;
    e3) receiving, at said child host, a response packet from the network and incrementing a count value if the packet is received either from the identified parent host or from another child host which is communicating with the identified parent host;

e4) repeating the step (e3) until the timing operation expires;

e5) repeating the steps (e2) to (e4) a predetermined number of times each time said timing operation expires; and e6) deriving the interference level of the selected channel from said count value and said predetermined number.

8. The method of claim 1, wherein the wireless communication network is formed by a plurality of parent hosts and a plurality of child hosts, and each of said parent hosts broadcasting a channel ownership packet at intervals determined by a first timer when the parent host starts transmitting a packet to the network, wherein the step (e) comprises the steps of:

e1) starting a second timer in response to the transmission of a packet by the step (d);

e2) receiving said channel ownership packet from the network and incrementing a count value in response to the receipt of the packet and identifying a source parent host of the received packet;

e3) repeating the steps (e2) until said timer expires;

e4) repeating the steps (e1) to (e3) a predetermined number of times each time said second timer expires; and e5) deriving the interference level of the selected channel from said count value, timeout periods of said first and second timers, a number of different source parent hosts identified by the step (e2), and said predetermined number.

9. The method of claim 1, wherein the step (e) comprises the steps of:

e1) starting a timer;

e2) repeatedly determining the interference power level of the selected channel until the timer expires;

e3) repeating the steps (e1) and (e2) a predetermined number of times each time said timer expires;

e4) producing a sum of the interference power levels repeatedly determined by the step (e2); and e5) deriving the interference level of the selected channel from said sum, said predetermined number and a timeout period of said timer.

10. The method of claim 1, wherein the step (e) comprises the steps of:

e1) starting a timer;

e2) detecting interference power level of the selected channel higher than a predetermined level and incrementing a variable by a predetermined amount in response to the detection of the higher interference power level;

e3) repeating the step (e2) until said timer expires;

e4) repeating the steps (e1) and (e2) a predetermined number of times each time said timer expires; and e5) deriving the interference level of the selected channel from the incremented variable, said predetermined number and a timeout period of said timer.

11. A method of determining the interference level of a wireless channel of a communication network, comprising the steps of:

a) broadcasting a polling packet to the network and starting a timing operation;

b) receiving a response packet from the network and incrementing a count value;

c) repeating the step (b) until the timing operation expires;

d) repeating the steps (a) to (c) a predetermined number of times each time said timing operation expires; and e) determining said interference level from a ratio of said count value to said predetermined number.

12. A method of determining the interference level of a wireless channel of a communication network, wherein the communication network is formed by a plurality of parent hosts and a plurality of child hosts, the method comprising the steps of:

a) identifying a parent host that can be accessed from a child host via said wireless channel;

b) broadcasting a polling packet from the child host to the network and starting a timing operation;

c) receiving, at said child host, a response packet from the network and incrementing a count value if the packet is received from the identified parent host or from another child host which is communicating with the identified parent host;

d) repeating the step (c) until the timing operation expires;

e) repeating the steps (b) to (d) a predetermined number of times each time said timing operation expires; and f) deriving said interference level from said count value and said predetermined number.

13. A method of determining the interference level of a wireless channel of a communication network, wherein the communication network is formed by a plurality of parent hosts and a plurality of child hosts, and each of said parent hosts broadcasting a channel ownership packet at intervals determined by a first timer when the parent host starts transmitting a packet to the network, comprising the steps of:

a) starting a second timer;

b) receiving said channel ownership packet from the network and incrementing a count value in response to the receipt of the packet and identifying a source parent host of the received packet;

c) repeating the steps (b) until said timer expires;

d) repeating the steps (a) to (c) a predetermined number of times each time said second timer expires; and e) determining said interference level from said count value, timeout periods of said first and second timers, a number of different source parent hosts identified by the step (b), and said predetermined number.

14. A method of determining the interference level of a wireless channel of a communication network, comprising the steps of:

a) starting a timer;

b) repeatedly determining receive power level of said wireless channel until the timer expires;

c) repeating the steps (a) and (b) a predetermined number of times each time said timer expires;

d) producing a sum of the interference power levels repeatedly determined by the step (b); and e) determining said interference level from said sum, said predetermined number and a timeout period of said timer.

15. A method of determining the interference level of a wireless channel of a communication network, comprising the steps of:

a) starting a timer;

b) detecting interference power level of said wireless channel higher than a predetermined level and incrementing a variable by a predetermined amount in response to the detection of the higher interference power level;

c) repeating the step (b) until said timer expires;

d) repeating the steps (a) and (b) a predetermined number of times each time said timer expires; and e) determining said interference level from the incremented variable, said predetermined number and a timeout period of said timer.

16. An apparatus for a wireless network, comprising:

a wireless transceiver connected to the network for selecting a wireless channel from a plurality of wireless channels; and an interference detector connected to the wireless transceiver for detecting interference level of the selected channel and determining therefrom a first quality value, causing said transceiver to maintain the selected channel for transmission of packets if the first quality value is greater than a first decision threshold, determining a second quality value of the maintained channel, and causing said transceiver to continue the transmission of packets over the maintained channel if the second quality value is greater than a second decision threshold which is lower than the first decision threshold.

17. The apparatus of claim 16, wherein said interference detector is arranged to:

detect interference level of the maintained channel during transmission of said packets, and derive the second quality value from the reciprocal of the detected interference level.

18. The apparatus of claim 16, wherein said interference detector is arranged to:

repeatedly broadcast a polling packet from said transceiver to the network immediately after said channel is selected, start a timing operation in response to the broadcasting of the packet a predetermined number of times each time the timing operation expires, and repeatedly receive a response packet from the network and repeatedly incrementing a count value when the timing operation is in progress, and determine an interference level of the selected channel from a ratio of said count value to said predetermined number and determine said first quality value from the determined interference level.

19. The apparatus of claim 16, wherein said interference detector is arranged to:

repeatedly broadcast a polling packet from said transceiver to the network over the maintained channel, start a timing operation in response to the broadcasting of the packet and restarts the timing operation a predetermined number of times each time the timing operation expires, repeatedly receive a response packet from the network, repeatedly increment a count value when the timing operation is in progress, and determine an interference level of the maintained channel from a ratio of said count value to said predetermined number and determine said second quality value from the determined interference level.

20. The apparatus of claim 16, wherein said network comprises a plurality of parent hosts and a plurality of child hosts, wherein said interference detector is arranged to:

receive a packet from the network to identify therefrom a parent host that can be accessed via the selected channel, repeatedly broadcast a polling packet to the network, start a timing operation in response to the broadcasting of the packet and restart the timing operation a predetermined number of times each time the timing operation expires, repeatedly receive a response packet from the network and increment a count value if the packet is received either from the identified parent host or from a child host which is communicating with the identified parent host when the timing operation is in progress, and derive an interference level of the selected channel from said count value and said predetermined number and determine said first quality value from the determined interference level.

21. The apparatus of claim 16, wherein said network comprises a plurality of parent hosts and a plurality of child hosts, wherein said interference detector is arranged to:

receive a packet from the network and identify therefrom a parent host that can be accessed via the maintained channel, repeatedly broadcast a polling packet from the child host to the network, start a timing operation in response to the broadcasting of the packet a predetermined number of times each time the timing operation expires, repeatedly receive a response packet from the network and increment a count value if the packet is received either from the identified parent host or from another child host which is communicating with the identified parent host when the timing operation is in progress, and determine an interference level of the maintained channel from said count value and said predetermined number and determine said second quality value from the determined interference level.

22. The apparatus of claim 16, wherein said network comprises a plurality of parent hosts and a plurality of child hosts, each of said parent host broadcasting a channel ownership packet at intervals determined by a first timer when the parent host starts transmitting a packet to the network, wherein said interference detector is arranged to:

start a second timer in response to the transmission of a packet from said transceiver to the network, and repeatedly restart the second timer a predetermined number of times each time said second timer expires, repeatedly receive said channel ownership packet from the network and increment a count value in response to the receipt of the packet and identify a source parent host of the received packet when said timer is running, and determine an interference level of the maintained channel from said count value, timeout periods of said first and second timers, a number of said identified source parent hosts, and said predetermined number and determine said second quality value from the determined interference level.

23. The apparatus of claim 16, wherein said interference detector is arranged to:

start a timer and repeatedly restart the timer a predetermined number of times each time said timer expires, repeatedly determine receive power level of one of said selected channel and said maintained channel when the timer is running, produce a sum of the repeatedly determined interference power levels, and determine an interference level from said sum, said predetermined number and a timeout period of said timer and determine one of said first and second quality values from the determined interference level.

24. The apparatus of claim 16, wherein said interference detector is arranged to:
   start a timer and repeatedly restart the timer a predetermined number of times each time said timer expires,
   repeatedly detect receive power level of one of said selected channel and said maintained channel, which power level is higher than a predetermined level and increment a variable by a predetermined amount in response to the detection of the higher interference power level when said timer is running, and
   determine an interference level from the incremented variable, said predetermined number and a timeout period of said timer and determine one of said first and second quality values from the determined interference level.

25. A wireless communication network comprising a plurality of wireless hosts, each of said hosts selecting a wireless channel from a plurality of wireless channels, detecting interference level of the selected channel and determining therefrom a first quality value, maintaining the selected channel for transmission of packets if the first quality value is. greater than a first decision threshold, determining a second quality value of the maintained channel, and continuing transmission of packets over the maintained channel if the second quality value is greater than a second decision threshold which is lower than the first decision threshold.

26. The wireless communication network of claim 25, wherein said host is arranged to:
   detect interference level of the maintained channel during transmission of said packets, and
   derive the second quality value from the reciprocal of the detected interference level.

27. The wireless communication network of claim 25, wherein said hosts comprise a plurality of parent hosts and a plurality of child hosts, and wherein the first and second decision thresholds of said parent hosts are respectively different from the first and second decision thresholds of said child hosts.

28. The wireless communication network of claim 25, wherein said host is arranged to:
   repeatedly broadcast a polling packet to the network immediately after said channel is selected and start a timing operation in response to the broadcasting of the packet a predetermined number of times each time the timing operation expires,
   repeatedly receive a response packet from the network and repeatedly increment a count value when the timing operation is in progress, and
   determine an interference level of the selected channel from a ratio of said count value to said predetermined number and determine said first quality value from the determined interference level.

29. The wireless communication network of claim 25, wherein said host is arranged to:
   repeatedly broadcast a polling packet to the network over the maintained channel and start a timing operation in response to the broadcasting of the packet a predetermined number of times each time the timing operation expires,
   repeatedly receive a response packet from the network and repeatedly increment a count value when the timing operation is in progress, and
   determine an interference level of the maintained channel from a ratio of said count value to said predetermined number and determine said second quality value from the determined interference level.

30. The wireless communication network of claim 25, wherein said hosts comprise a plurality of parent hosts and a plurality of child hosts, and wherein each of said child hosts is arranged to:
   identify a parent host that can be accessed from the child host via the selected channel immediately after said channel is selected,
   repeatedly broadcast a polling packet from the child host to the network and start a timing operation in response to the broadcasting of the packet a predetermined number of times each time the timing operation expires,
   repeatedly receive a response packet from the network and increment a count value if the packet is received either from the identified parent host or from another child host which is communicating with the identified parent host when the timing operation is in progress, and
   derive the interference level of the selected channel from said count value and said predetermined number.

31. The wireless communication network of claim 25, wherein said hosts comprise a plurality of parent hosts and a plurality of child hosts, and wherein each of said child hosts is arranged to:
   identify a parent host that can be accessed from the child host via the maintained channel during transmission of said packets,
   repeatedly broadcast a polling packet from the child host to the network and start a timing operation in response to the broadcasting of the packet a predetermined number of times each time the timing operation expires,
   repeatedly receive a response packet from the network and increment a count value if the packet is received either from the identified parent host or from another child host which is communicating with the identified parent host when the timing operation is in progress, and
   derive the interference level of the maintained channel from said count value and said predetermined number.

32. The wireless communication network of claim 25, wherein said hosts comprise a plurality of parent hosts and a plurality of child hosts, each of said parent hosts broadcasting a channel ownership packet at intervals determined by a first timer when the parent host starts transmitting a packet to the network, wherein each of said hosts is arranged to:
   start a second timer in response to the transmission of a packet and repeatedly restart the second timer a predetermined number of times each time said second timer expires,
   repeatedly receive said channel ownership packet from the network and increment a count value in response to the receipt of the packet and identify a source parent host of the received packet when said timer is running, and
   derive the interference level of the maintained channel from said count value, timeout periods of said first and second timers, a number of said identified source parent hosts, and said predetermined number.

33. The wireless communication network of claim 25, wherein said host is arranged to:

start a timer and repeatedly restart the timer a predetermined number of times each time said timer expires, repeatedly determine interference power level of the selected channel when the timer is running, produce a sum of the repeatedly determined interference power levels, and derive the interference level of the maintained channel from said sum, said predetermined number and a timeout period of said timer.

34. The wireless communication network of claim 25, wherein said host is arranged to:

start a timer and repeatedly restart the timer a predetermined number of times each time said timer expires, repeatedly detect interference power level of the selected channel higher than a predetermined level and increment a variable by a predetermined amount in response to the detection of the higher interference power level when said timer is running, and derive the interference level of the maintained channel packets from the incremented variable, said predetermined number and a timeout period of said timer.

* * * * *